(12) United States Patent
Principe

(10) Patent No.: US 6,723,668 B2
(45) Date of Patent: Apr. 20, 2004

(54) MULTIPLE LAYER CLOTH FOR CASINO, GAMING AND BILLIARD TABLES AND METHOD THEREFOR

(75) Inventor: Ivette Principe, Ft. Lauderdale, FL (US)

(73) Assignee: Graph to Graphics, Inc., Ft. Lauderdale, FL (US)

(*) Notice: Subject to any disclaimer, the term of this patent is extended or adjusted under 35 U.S.C. 154(b) by 204 days.

(21) Appl. No.: 09/872,942

(22) Filed: Jun. 1, 2001

(65) Prior Publication Data

US 2002/0123279 A1 Sep. 5, 2002

Related U.S. Application Data

(60) Provisional application No. 60/258,829, filed on Dec. 28, 2000.

(51) Int. Cl.[7] .............................. B32B 15/14; B32B 5/24
(52) U.S. Cl. ................. 442/316; 442/304; 442/319; 442/376; 442/378; 442/80; 442/82; 442/136; 442/141; 442/144; 442/232; 442/234; 442/235; 428/195; 428/197; 428/920; 428/921
(58) Field of Search .................... 442/304, 316, 442/319, 376, 378, 80, 82, 136, 141, 144, 232, 234, 235; 428/195, 197, 920, 921

(56) References Cited

U.S. PATENT DOCUMENTS

| | | | | |
|---|---|---|---|---|
| 3,094,547 A | * | 6/1963 | Heine ........................ 558/175 |
| 3,702,797 A | | 11/1972 | Cochran, II ................. 161/66 |
| 3,713,960 A | | 1/1973 | Cochran, II ................. 161/66 |
| 3,728,204 A | | 4/1973 | Cochran, II ................. 161/66 |
| 4,062,993 A | | 12/1977 | Seward ....................... 428/93 |
| 4,086,112 A | | 4/1978 | Porter ........................ 156/73.1 |
| 4,088,442 A | | 5/1978 | Hugelin et al. ............... 8/2.5 A |
| 4,096,310 A | | 6/1978 | Buckwalter et al. ......... 428/288 |
| 4,164,392 A | | 8/1979 | Hauser et al. ................ 8/18 R |
| 4,199,633 A | | 4/1980 | Blore .......................... 428/91 |
| 4,255,150 A | | 3/1981 | Fennekels et al. ............ 8/471 |
| 4,296,162 A | | 10/1981 | Jean ........................... 428/213 |
| 4,298,643 A | | 11/1981 | Miyagawa et al. ........... 428/85 |
| 4,318,956 A | | 3/1982 | Stevens et al. ............. 428/265 |
| 4,330,588 A | | 5/1982 | Larson et al. .............. 428/264 |
| 4,604,998 A | | 8/1986 | Bellina .................... 128/132 D |
| 4,666,765 A | | 5/1987 | Caldwell et al. ........... 426/266 |
| 4,714,650 A | | 12/1987 | Obayashi et al. ........... 428/265 |
| 4,808,465 A | | 2/1989 | Vane ......................... 428/253 |
| 4,901,738 A | | 2/1990 | Brink et al. ................ 128/849 |
| 4,952,950 A | | 8/1990 | Bibl et al. .................. 346/157 |
| 4,959,040 A | | 9/1990 | Gardner et al. ............ 474/103 |
| 4,977,416 A | | 12/1990 | Bibl et al. .................. 346/155 |
| 4,981,544 A | | 1/1991 | Nordale ..................... 156/252 |
| 5,003,325 A | | 3/1991 | Bibl .......................... 346/136 |
| 5,034,774 A | | 7/1991 | Higginson et al. .......... 355/256 |
| 5,149,582 A | * | 9/1992 | LaMarca et al. ........... 442/316 |

(List continued on next page.)

Primary Examiner—Terrel Morris
Assistant Examiner—Norca L. Torres

(57) ABSTRACT

The cigar and cigarette burn resistant gaming cloth table includes a layer of fire retardant treated knit fabric laminated to a thin sheet of aluminum and wherein the other side of the aluminum sheet is laminated to a layer of non-woven synthetic fabric. Preferably, the top layer knit fabric is laminated to the aluminum via a latex adhesive. The lower non-woven fabric is laminated to the aluminum sheet via latex adhesive. Preferably, the knit layer, prior to being laminated to the thin sheet of aluminum, is treated with a fire retardant and an oil and water repellant chemical composition. Most preferably, the fire retardant and oil and water repellant chemical composition is a phosphorus fluorocarbon. The method includes treating the knit polyester fabric with fire retardant chemical, laminating a thin sheet of aluminum between the knit fabric layer and a layer of non-woven synthetic fabric. Preferably, the lamination is accomplished with a latex adhesive.

15 Claims, 1 Drawing Sheet

U.S. PATENT DOCUMENTS

| | | | |
|---|---|---|---|
| 5,160,505 A | 11/1992 | Seveno et al. | 8/471 |
| 5,234,753 A | 8/1993 | Williams, Jr. | 428/265 |
| 5,298,031 A | 3/1994 | Gabay et al. | 8/471 |
| 5,300,241 A | 4/1994 | Mikami et al. | 252/8.8 |
| 5,370,933 A | 12/1994 | Govindan | 428/272 |
| 5,466,505 A | 11/1995 | Fukuda et al. | 428/91 |
| 5,568,666 A * | 10/1996 | Seibert | 8/149.1 |
| 5,580,410 A | 12/1996 | Johnston | 156/240 |
| 5,633,064 A | 5/1997 | Ragland et al. | 428/95 |
| 5,825,374 A | 10/1998 | Albertalli et al. | 346/136 |
| 5,833,874 A | 11/1998 | Stewart et al. | 252/8 |
| 5,840,145 A | 11/1998 | Schmidt et al. | 156/272.4 |
| 5,855,980 A | 1/1999 | Roualdes et al. | 428/90 |
| 5,962,129 A | 10/1999 | Halloran et al. | 428/355 |
| 5,981,021 A | 11/1999 | McCulloch | 428/97 |
| 5,992,986 A | 11/1999 | Gyotoku et al. | 347/85 |
| 5,997,124 A | 12/1999 | Capps et al. | 347/14 |
| 6,010,205 A | 1/2000 | Billet | 347/40 |
| 6,194,497 B1 | 2/2001 | Willems et al. | 524/165 |

\* cited by examiner

MULTIPLE LAYER CLOTH FOR CASINO, GAMING AND BILLIARD TABLES AND METHOD THEREFOR

This is a regular patent application based upon and claiming priority from provisional patent Ser. No. 60/258,829 filed on Dec. 28, 2000.

The present invention relates to a multiple layer or a laminate cloth for casino, gaming and billiard tables and a method of manufacturing the same.

Background of the Invention

Gaming table covers are subject to considerable abuse by patrons of the card game, dice game, billiards or roulette. Particularly, patrons may accidently spill alcoholic or non-alcoholic drinks on the gaming table cover. Prior art gaming table covers tend to absorb spilled drinks and these spots rapidly deteriorate the cloth and the underlying table structure (which typically absorbs moisture). Further, the spots adversely affect the playing surface of the gaming card table and may cause the cards to absorb the spilled drink. The quality and responsiveness of the gaming table may also change, e.g., with respect to a dice game. Further, patrons of casinos and other gaming establishments may accidently drop lit cigars and cigarettes on the gaming table covers. These lit cigars or lit cigarettes (approximate temperature of 1200 degrees Fahrenheit) quickly burn prior art gaming table covers. In both instances of abuse, the table must be closed down and taken out of service, the gaming table cover must be removed and a new gaming table cover must be mounted via a stretch mount about the table's periphery on the underlying substrate. Casino patrons dislike the look of stained gaming table covers (originating from spilled drinks) and table covers with burn marks are similarly unsightly. Patrons will avoid these stained and abused gaming tables thereby reducing the casino's revenue. Also, the distressed look of the tables engenders a "poor quality" image in the minds of casino patrons. This image adversely effects the casino's revenue.

Billiard table covers suffer from the same types of abuse as the casino gaming table cover cloths described above.

Hence, there is a need for a water resistant cigar and cigarette burn resistant gaming table or billiard table cover.

U.S. Pat. No. 5,855,980 to Roualdes et al. herein ("Roualdes '980") discloses a fabric having a non ferrous metal core configured as a sheet having a thickness less than 0.15 mm. Preferably, the laminated structure consists of three layers which includes a metal core arranged between two sheets or layers formed by a conventional pliant material such as woven cloth or decorative paper. Preferably, the metal core is aluminum, copper, tin or brass, among others. The main object of Roualdes '980 fabric is to obtain a pliant material which has an aesthetic appearance on the outside keeping its shape after deformation and therefore having no concomitant spring back or plastic recovery. The outer layers applied to the metal non-ferrous or aluminum core is a woven cloth or non-woven fabric. Roualdes '980 does not discuss the thermal transfer characteristics of the laminate cloth structure. Roualdes '980 does not discuss the use of fire retardant glue or adhesive bonding the non-woven fabric to the aluminum sheet and the fabric adhered to the top of the metal sheet.

U.S. Pat. No. 4,296,162 to Jean (herein "Jean '162") discloses a wall covering that is a composite, laminate structure having a top layer as a wall covering fabric, a central layer of aluminum foil having a thickness of between 0.00025–0.005 inches and a backing layer of fabric paper, confill, scrim or the like. The primary stated purpose of the Jean '162 composite, laminate fabric is to provide energy efficient wall surface covering for reducing heat and vapor transmission and further which is sturdy, durable, flame resistant and esthetically pleasing. Jean '162 discusses the ability of this laminate structure to present a barrier to the transmission of radiant heat. However, Jean '162 also states "the material also has acceptable ratings as to fire resistance, which makes it even more preferable for use in decorating or redecorating living spaces." Col. 4, lines 19–22. Jean '162 does not discuss the utilization of a knitted top layer, a non-woven lower layer and the use of fire retardant glue. Further, Jean '162 does not discuss "hot spot" fire resistance value, due to the deposition of a lit cigarette, of the composite fabric. Composite cloth structures providing radiant thermal barriers do not necessarily provide hot spot thermal barriers.

U.S. Pat. No. 5,633,064 to Ragland et al. (herein "Ragland '064") discloses a heat barrier laminate. The laminate of Ragland '064 includes a first metal layer between two insulating layers and a second metal layer on the outside surface of one of the insulating layers. Ragland '064 states "it has been found that the combination of a thin layer of flame retardant material with a thin metallic layer, which has high heat conductivity, provides unusually effective high temperature protection for ordinary insulation material. This combination enables the use of such insulation materials in higher temperature applications than they can normally be used, specially in "spot" insulation applications." Col. 2, lines 36–42. The metallic layer in the Ragland '064 laminate is particularly effective in spot heat barrier applications because the metal layer tends to conduct heat from the hot spot area and dissipate the heat more uniformly over a larger surface area, thereby protecting the insulating layer and making the insulating layer more effective. The metal layer is a one mil aluminum foil with 0.1 inch aramid non-woven fiber mat on one side and a polyester non-woven fiber mat on the other side. A 0.75 in. laminate may provide a delta T temperature differential of about 120° Fahrenheit while a 0.375 inch laminate may provide a delta T temperature differential of about 100° Fahrenheit between an automotive exhaust system (the hot spot temperature source) and the floor of a passenger compartment. The preferred thickness of the laminate is ½ to ⅜ in. thick and the preferred weight is 3 to 4 lb/ft$^3$ or less. The flame retardant layer is preferably 0.1 in. or less in combination with the metal layer which is preferably about 0.005 in. or less in thickness. The metal layer is preferably metal foil which provides flexibility for manufacturing and for end use applications, having a thickness less than about 0.003 in. and preferably less than about 0.002 in. Most preferably, the metal foil has a thickness in the range of about 0.001 in. to about 0.0015 in. Aluminum foil mounted on aramid non-woven fiber batt provides a flame retardant barrier. Col. 4, lines 3–11. The preferred adhesive for bonding the metal layer onto the insulating layer is a thermoplastic adhesive typically about 0.0015 in. in thickness.

U.S. Pat. No. 3,702,797 to Cochran (herein "Cochran '797") discloses an antistatic textile product utilizing an aluminum foil back. Aluminum foil has been utilized as a base layer to dissipate static charge in carpeting. This aluminum foil is sometimes adhesively bonded to the back of a carpet fabric but "conventional latex or other like adhesives present other problems, the most important of which is the fact that such adhesives tend to form continuous films which function to electrically insulate the pile yarn from the aluminum foil." Col. 1 lines 51–55. In Cochran '797, the aluminum metal foil is bonded to the backing fabric by means of a web. The construction of the web consists of continuous overlapping filaments randomly disposed with respect to each other. This web construction and the tendency of the filaments therein to penetrate the yarn adjacent thereto is established by a hot melt process without forming a continuous film. In this manner, the aluminum foil would be in direct contact with the bottom portions of pile yarn when the web is open.

U.S. Pat. No. 3,713,960 to Cochran discloses an anti-static tufted product formed of a non electrically conductive textile material bonded to an electrically conductive foil. U.S. Pat. No. 3,728,204 to Cochran discloses a textile product. The textile product has an antistatic and flame retardant configuration having a base and a pile surface of yarn, an adhesive on the opposite surface of the textile product and an electrically and thermally conducting metal foil bonded to the product by an adhesive. Aluminum foil is sometimes utilized. U.S. Pat. No. 4,062,993 to Seward discloses a textile and a method of making same. A metallic foil layer is penetrated by pile tuft.

U.S. Pat. No. 4,604,998 to Bellina discloses a laser surgery drape. The drape includes metallic and non-metallic layers with an air space therebetween. U.S. Pat. No. 4,808,465 to Vane discloses a flame resistant composite material utilizing one layer of lead and one layer of flame resistant fibrous materials which are bonded together. U.S. Pat. No. 4,901,738 to Brink discloses a laser shield having a non-linting fabric sheet and a metal layer. U.S. Pat. No. 4,981,544 to Nordale discloses a static dissipative tape for use as a rug or runner in static sensitive areas.

U.S. Pat. No. 5,962,129 to Halloran states that phosphate esters and fluoropolymers are known as organic compounds used for flame retardancy. U.S. Pat. No. 6,194,497 to Willems describes an anti-static resin compound containing fluorinated phosphonium sulfonates. U.S. Pat. No. 5,833,874 to Stewart describes a fire extinguishing gels with surfactant system composed of a non-ionic surfactant, a film forming fluorocarbon surfactant and a phosphorus containing antiflocculent.

OBJECTS OF THE INVENTION

It is an object of the present invention to provide a cigar and cigarette burn resistant gaming table cloth which may be configured as a cover for a casino card table, a gaming table or a billiard table.

It is another object of the present invention to provide a gaming table cloth which is also oil repellant and water repellant.

It is a further object of the present invention to provide a gaming table cloth which significantly resists burning by a lit cigarette or a lit cigar for about three minutes or more during direct contact exposure to the lit end of the cigar or cigarette.

SUMMARY OF THE INVENTION

The cigar and cigarette burn resistant gaming cloth table includes a layer of fire retardant treated knit fabric laminated to a thin sheet of aluminum and wherein the other side of the aluminum sheet is laminated to a layer of non-woven synthetic fabric. Preferably, the top layer knit fabric is laminated to the aluminum via a latex adhesive. The lower non-woven fabric is laminated to the aluminum sheet via latex adhesive. Preferably, the knit layer, prior to being laminated to the thin sheet of aluminum, is treated with a fire retardant and an oil and water repellant chemical composition. Most preferably, the fire retardant and oil and water repellant chemical composition is a phosphorus fluorocarbon. The method includes treating the knit polyester fabric with fire retardant chemical, laminating a thin sheet of aluminum between the knit fabric layer and a layer of non-woven synthetic fabric. Preferably, the lamination is accomplished with a latex adhesive.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a laminated cigar and cigarette burn resistant gaming table cloth and a method of manufacturing the same.

Figure 1:
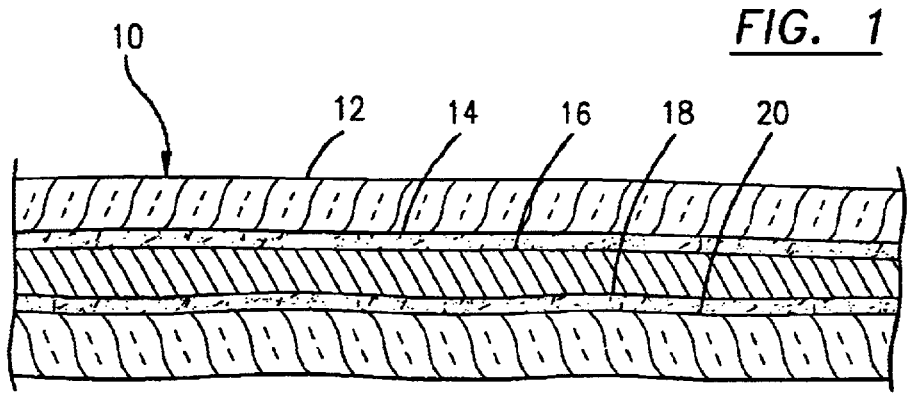
FIG. 1 diagrammatically illustrates the laminated table cloth for casino, gaming and billiard tables.

FIG. 1 diagrammatically shows cloth composite 10 consisting of a treated top layer of polyester fabric 12, an adhesive layer 14, a metallic core 16 of aluminum, a further adhesive layer 18 and a backing or lower layer 20 of non-woven synthetic fabric. Top layer 12 is a knit polyester fabric which is treated with a fire retardant and an oil and water repellant chemical composition, preferably, a non-ionic, organic phosphorus fluorocarbon chemical composition. Adhesive layers 14, 18 preferably are latex adhesive which is a fire retardant glue. Preferably, knit top layer 12 is 8–9 oz. per linear yard; aluminum layer 16 is 1.5 mil thick and is substantially pure aluminum (alloy grade 1145), and non-woven lower fabric layer 20 is about 6 oz. per linear yard and is polyester having a unidirectional fiber orientation.

Experiments have shown that prior art gaming table covers burn in 11–20 sec. upon direct contact with lit cigarettes or lit cigars (approximate temperature: 1200° F.). The cloth composite of the present invention does not burn unless the hot spot exposure exceeds at least 3 minutes of direct contact with a lit cigarette or lit cigar. It is believed that the aluminum acts as a heat sink and prevents burn on the fabric for up to 3–4 minutes. The non-woven latex adhered lower fabric layer 20 adds stability to the cloth composite 10 in both the lateral and the longitudinal directions and helps the aluminum sheet to perform as a heat sink and to disperse heat away from the heat source.

Figure 2:
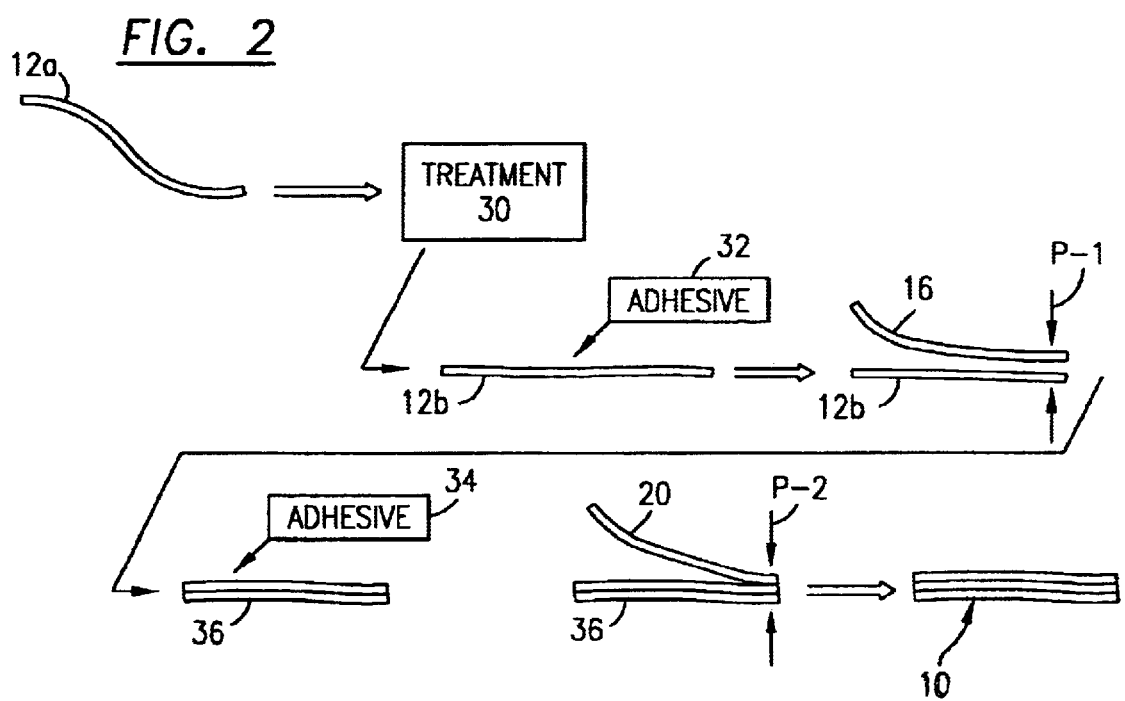
FIG. 2 diagrammatically illustrates the method of processing and manufacturing the gaming table cloth.

FIG. 2 diagrammatically illustrates the one method of manufacturing the gaming table cloth. Top fabric layer 12a is treated with a primary treatment chemical composition, preferably, an organic phosphorus fluorocarbon. Further details of this composition are provided below. Treatment 30 includes treating woven fabric 12a with the fire retardant and oil and water repellant chemicals (the phosphorus fluorocarbon) as well as dyeing the treated fabric. After chemical treatment and the dye treatment, adhesive 32 (preferably, a latex adhesive) is sprayed or spread onto treated fabric 12b. Thereafter, aluminum sheet 16 is placed on the adhesive coated, pre-treated knit fabric 12b. Pressure P1 is utilized to laminate aluminum sheet 16 onto treated knit fabric 12b.

Thereafter, adhesive 34 is applied to intermediate laminate structure 36. Thereafter, non-woven backing fabric 20 is placed on the adhesive coated, intermediate laminate 36. Pressure P2 is applied to the composite thereby creating the three layer laminate structure 10.

Manufacturing Details

The preferred top layer of fabric is a two bar (or three bar), warp knitted, 75 denier, filament of 100% continuous multifilament polyester, on all bars. The fabric is 37–41 wales per inch, 89–94 courses per inch. The ball burst test for this top layer fabric is 170 minimum. The fabric has a 28 and 32 gauge construction. The guide bar movement is 1–0/1–2 for one bar and 1–0/4–5 for the other. The finished weight of the fabric is 6 oz–9 oz per linear yard. Warp knitting is a method of making a fabric by normal knitting means in which the loops made from each warp thread are formed substantially along the length of the fabric. It is characterized by the fact that each warp thread is fed more or less in the line with the direction in which the fabric is produced.

The fabric is heated until it achieves a temperature of 440 degrees F. and overfed at 4% to increase its weight and compensate for shrinkage. The fabric is knitted at 90 inches wide to end up with 60 inches wide.

The fabric is napped or raised by the use of a mechanical teasel to break some of the filaments in the multifilament yarn. This produces a layer of protruding fibers on the surface, which by the nature of the fabric's construction filament yarn, are still tied to the whole.

The fabric is then sheared. This shearing crops the protruding fibers to a known predetermined length or height of protrusion. The fabric is then raised or napped again to give a full hand and sheared to unify the raised pile length.

The napping and shearing process is performed twice to achieve the desire printable pile. The fabric is then heat set at 440 degrees Fahrenheit on a 6 zone Tenter frame at 25 yards per minute without any stretching on the frame. Accordingly, the fabric ends up compacted.

The fabric is then preshrunk on contact heat at 425 degrees F., 9 psi using a DS-60 transfer laminator or a Astechnologies 7900T heat transfer press at 1.5 psi.

The fabric is laminated with the 90 gram dye-sublimation paper which is printed on a Raster Graphics 5442, electrostatic printer. Saturation on 255% cyan, 255% magenta, 255% yellow, 255% spot color produces a gaming green color on the fabric. Using concentrates and replenisher every 100 feet to achieve full color saturation. Rewind Speed of 6 Black, 6 Cyan, 6 Magenta, 6 Yellow, 6 Spot Green. Inking Speeds 4 Black, 2 Cyan, 2.5 Magenta, 4 Yellow, 2 Spot Green. Print Ink Contrast −5 Black, −11 Cyan, −16 Magenta, −10 Yellow, −14 Spot Green. Using ICC profiles on. Printing order BSCMY.

The fabric is then cured with a primary treatment chemical composition, that is, treated with fire retardant and oil and water repellant chemicals. An organic phosphorus fluorocarbon mixture is used as the primary treatment chemical composition. Characteristics of the primary treatment chemical are set forth below. This chemical is nonionic in nature, +/−31% solids, density is 9.2 lbs./gal with miscible solubility. The chemical is applied to the knit fabric in a Tenter frame containing a bath of 30% chemicals to 70% water, with pressure on rollers. The chemical treated fabric is cured at 300 degrees F., and 15 yards per minute through the 4 heat zone frame.

The pre-treated fabric is then laminated with a sheet of 100% Aluminum-0.0015 in. thick, 1145-O, that is, alloy grade: 1145 and temper O (annealed). The aluminum sheet is laminated to the treated fabric via a latex adhesive. The adhesive is fire or burn retardant. The resulting knit fabric—aluminum laminate is then further laminated to a light filtering non-woven fabric after the two layer laminate is coated with 25 grams of full surface adhesive.

The lower layer of non-woven fabric is 2.68 oz./sq. yd, 0.015 inches thick having a tensile strength of MD 22.2 lbs/in. and CD 2.9 lbs/in. fiber composition. The primary composition of the lower layer is polyester. The lower layer is bonded to the two layer laminate by a latex adhesive. The fiber orientation for the non-woven fabric is unidirectional. A fire retardant glue, a latex adhesive, is used to bond all three substrate layers together.

The aluminum acts as a heat sink and prevents burns on the fabric for up to 3–4 minutes. The nonwoven latex adhered lower layer adds stability to the cloth in the lateral and longitudinal directions and helps the aluminum perform to disperse heat away from the heat source.

| | |
|---|---|
| Appearance: | Slightly hazy, pale yellow liquid |
| Chemical Nature: | Organic phosphorus fluorocarbon mixture |
| Ionic Nature: | Non-ionic |
| Solids: | ±31% |
| Density: | 9.2 lbs./gal. |
| Solubility: | Miscible |

The primary treatment chemical is sold under the trademark Apexguard #620 by Apex Chemicals, Inc. of Spartanburg, S.C. The chemical is a unique product that provides both effective water repellency and a durable non-halogen flame retardant finish for polyester fabrics. It is cured or themosoled into the polyester fiber itself thereby providing durability and can meet or exceed a variety of flammability standards and water repellency requirements.

The advantages of the primary treatment chemical are: (a) Durable to repeated dry cleaning and laundering; (b) Flame retardant component is halogen free; (c) Produces a soft, dry type of hand; (d) Provides an effective water ad oil repellent finish; and, (e) Properly treated, polyester fabrics will pass various flammability standards.

Application Data

Pad Application:

A suggested starting concentration to pass a vertical flame test and provide a water repellant finish is 15%–20% OWB APEXGUARD #620 in the pad bath. Set the pad pressure and speed so the fabric pickup is at least 75% by weight. Finish temperature needs to be 380° F.–400° F. The fabric temperature needs to reach 375 F. for proper curing.

Spray Application:

Using a mix of 20%–25% by weight APEXGUARD #620, set spray to achieve at least 70%–75% by weight and finish at 380° F.–400° F. Any excess surface residue may be rinsed after curing if necessary.

| Formulation Data | |
|---|---|
| Trade Name: | Apexguard #620 |
| Chemical Name & Syn: | Phosphate ester-Fluoropolymer Emulsion |
| Chemical Family: | Phosphorus flame retardant mixture |
| Formula: | Proprietary |
| Boiling Point: | 215° F. |
| Specific Gravity: | 1.15 @ 25° C. |
| Percent Volatiles: | 68.5% by wt. |
| Solubility in Water: | Soluble |

Alternative Methods of Manufacture

The manufacture of the three layer composite 10 can be modified. One such modified method of manufacturing includes laminating the aluminum sheet or web to the pre-treated fabric 12 with a needle punch operation. An explanation of a needle punching operation to adhere the aluminum sheet to the treated top knit fabric layer 12 is generally presented in U.S. Pat. No. 4,062,993 to Seward. A simplified explanation follows. The treated top layer knit fabric 12 is covered with adhesive and the metallic aluminum layer is placed over the adhesive. A plurality of needles are forced through the aluminum sheet and into the knit fabric and then pulled out thereby pulling fabric loops away from the fabric and integrating, to some degree, loop portions of the knitted fabric into the aluminum sheet. This needle punch and adhesive operation may increase the stability of the two layer composite 36. This needle punch operation also breaks up the aluminum sheet and adds a degree a flexibility to the ultimate three layer laminate cloth cover 10. It is believed that this increased flexibility enables the manufacturer to better handle move and carry the two layer and three layer laminate as compared to the earlier described laminates.

Another method of distributing or creating a sheet of aluminum on the treated top knit layer 12 is to mix aluminum powder in a polyester resin and spread the resulting composition (which may be a foam) over the pre-treated knit layer 12. The foam is spread and then scrapped away from the fabric surface leaving 1–5 mm of aluminum resin coating on the fabric. Thereafter, the two layer cloth metal sheet laminate 36 is cured, the resin layer is dried thereby forming core aluminum layer 16. See FIG. 1. The non-woven fabric layer 20 is then adhered to the two layer laminate.

A third method of manufacturing involves coating the pre-treated knit layer 12 with adhesive and depositing aluminum on the adhesive via an electrostatic flocking method. As is known, the fabric would be charged to one type of electro charge and the aluminum or carrier for the aluminum powder would be charged to the opposite electrical charge thereby resulting in the charged powder adhering to the latex adhesive on the pre-treated knit layer 12. The term "thin sheet of aluminum" encompasses these methods of manufacturing the three layer cloth laminate 10.

Experiments have shown that metal sheets other than aluminum core layer 16 do not create a laminate cloth structure which is acceptable. Steel does not adhere to the cloth layers and is too heavy. The flexibility of the cloth in the length and width is important because the cloth is stretched over the gaming table (whether a card table or billiard table). Also, these tables are typically 6'×5' or larger and the weight of the composite cloth is a factor in handling and installing the cloth on a table.

The claims appended hereto are meant to cover modifications and changes within the scope and spirit of the present invention.

What is claimed is:

1. A cigar and cigarette burn resistant gaming table cloth which resists decomposition by burn and char formation by a lit cigarette or cigar for at least three minutes during direct contact exposure to the lit end of the cigar or cigarette comprising a layer of fire retardant treated knit polyester fabric laminated to a thin sheet of aluminum, said aluminum having a thickness of about 1.5 mils, and said aluminum sheet laminated to a backing layer of non-woven synthetic fabric said aluminum acting as a heat sink and preventing decomposition by burn and char formation on the fabric for at least three minutes.

2. A burn resistant gaming table cloth as claimed in claim 1 including intermediate layer of adhesive between the knit layer and said aluminum sheet and between said aluminum sheet and the non-woven fabric layer.

3. A burn resistant gaming table cloth as claimed in claim 2 including dyeing the laminated fabric of said knit layer, aluminum sheet layer and non-woven fabric layer with a background color and imprinting said composite laminated fabric with gaming indicia.

4. A burn resistant gaming table cloth as claimed in claim 3 wherein said knit layer is cured with from the group consisting of one of a fire retardant chemical composition and an oil and water repellant chemical composition prior to lamination to said aluminum sheet layer.

5. A burn resistant gaming table cloth as claimed in claim 3 wherein said knit layer is cured with a fire retardant and an oil and water repellant chemical composition prior to lamination to said aluminum sheet layer.

6. A burn resistant gaming table cloth as claimed in claim 5 wherein said fire retardant and an oil and water repellant chemical composition is a phosphorus fluorocarbon.

7. A gaming table cloth as claimed in claim 5 wherein said fire retardant and an oil and water repellant chemical composition is a non-ionic phosphorus fluorocarbon.

8. A burn resistant gaming table cloth as claimed in claim 2 wherein said adhesive is a latex adhesive.

9. A burn resistant gaming table cloth as claimed in claim 2 wherein said non-woven fabric is a polyester.

10. A burn resistant gaming table cloth as claimed in claim 7 wherein said fire retardant and an oil and water repellant chemical composition is a phosphate ester-fluoropolymer.

11. A laminated cigar and cigarette burn resistant gaming table cloth comprising a thin sheet of aluminum laminated with a latex adhesive between a layer of fire retardant treated knit polyester fabric and a backing layer of non-woven synthetic fabric.

12. A burn resistant gaming table cloth as claimed in claim 11 wherein said knit fabric is also treated for water repellency.

13. A cigar and cigarette burn resistant gaming table cloth which resists decomposition by burn and char formation by a lit cigarette or cigar for at least three minutes during direct contact exposure to the lit end of the cigar or cigarette comprising a layer of fire retardant treated knit polyester fabric laminated to a thin sheet of aluminum, and said aluminum sheet mounted to a backing layer of synthetic fabric, said aluminum acting as a heat sink and preventing decomposition by burn and char formation on the fabric for at least three minutes.

14. A burn resistant gaming table cloth as claimed in claim 13 wherein the mounting of said backing layer form the group consisting of one of adherence, spray and needle punch mount.

15. A burn resistant gaming table cloth as claimed in claim 14 wherein backing layer is a non-woven fabric.

\* \* \* \* \*